(12) United States Patent
Jain et al.

(10) Patent No.: US 12,158,860 B2
(45) Date of Patent: Dec. 3, 2024

(54) DATA COMPACTION SYSTEMS AND METHOD

(71) Applicant: Druva Inc., Santa Clara, CA (US)

(72) Inventors: Somesh Jain, Pune (IN); Rohit Singh, Ghaziabad (IN); Shubham Agarwal, Kota (IN); Milind Vithal Borate, Pune (IN)

(73) Assignee: Druva Inc., Santa Clara, CA (US)

( * ) Notice: Subject to any disclaimer, the term of this patent is extended or adjusted under 35 U.S.C. 154(b) by 2 days.

(21) Appl. No.: 18/095,825

(22) Filed: Jan. 11, 2023

(65) Prior Publication Data

US 2023/0222101 A1 Jul. 13, 2023

(30) Foreign Application Priority Data

Jan. 13, 2022 (IN) .............................. 202241002128

(51) Int. Cl.
| | | |
|---|---|---|
| *G06F 16/11* | (2019.01) | |
| *G06F 11/14* | (2006.01) | |
| *G06F 16/13* | (2019.01) | |
| *G06F 16/16* | (2019.01) | |
| *G06F 16/172* | (2019.01) | |
| *G06F 16/174* | (2019.01) | |
| *G06F 16/903* | (2019.01) | |

(52) U.S. Cl.
CPC ........ *G06F 16/128* (2019.01); *G06F 11/1435* (2013.01); *G06F 11/1453* (2013.01); *G06F 11/1466* (2013.01); *G06F 11/1469* (2013.01); *G06F 16/125* (2019.01); *G06F 16/13* (2019.01); *G06F 16/162* (2019.01); *G06F 16/172* (2019.01); *G06F 16/1744* (2019.01); *G06F 16/1748* (2019.01); *G06F 16/90335* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 10,275,361 B2* | 4/2019 | Ish ...................... | G06F 12/0246 |
| 2013/0325821 A1* | 12/2013 | Amit ................... | G06F 16/1748 |
| | | | 707/E17.005 |
| 2018/0150485 A1* | 5/2018 | Tripathy ............... | G06F 16/1748 |
| 2021/0011652 A1* | 1/2021 | Shu ....................... | G06F 3/0679 |
| 2022/0107925 A1* | 4/2022 | Goswami .............. | G06F 16/215 |
| 2023/0054801 A1* | 2/2023 | Chen ..................... | G06F 3/0644 |
| 2023/0222093 A1* | 7/2023 | Borate ................. | G06F 11/1466 |
| | | | 707/694 |
| 2023/0222101 A1* | 7/2023 | Jain ....................... | G06F 16/172 |
| | | | 707/641 |

\* cited by examiner

*Primary Examiner* — Kim T Nguyen
(74) *Attorney, Agent, or Firm* — IceMiller LLP

(57) ABSTRACT

A file system and a related method are presented. The file system includes a data storage including a plurality of data blocks; a merge index including a plurality of namespace entries, wherein the plurality of namespace entries include a plurality of blockmap entries and a plurality of local reference entries; a deduplication database including a plurality of deduplication indices and a plurality of global reference entries for a plurality of datasets; and an indexing system configured to generate the plurality of namespace entries and the plurality of global reference entries.

20 Claims, 11 Drawing Sheets

DATA COMPACTION SYSTEMS AND METHOD

CROSS REFERENCE TO RELATED APPLICATION

This application claims a benefit of, and priority to, India Provisional Patent Application No 202241002128, filed Jan. 13, 2022, the contents of which is incorporated by reference in its entirety.

BACKGROUND

Embodiments of the present invention generally relate to systems and methods for data compaction in cloud-based storage solutions, and more particularly to systems and methods for data compaction in object-based storage solutions.

Modern businesses often rely on computer systems and computer networks. It is undesirable to experience an irretrievable loss of data in such business computer systems. To prevent loss of data, computer systems are periodically backed up using a data backup file system configured to store the backup data on a storage server (e.g., a cloud-based storage). Backup data includes data blocks and metadata. For generating data blocks source data is split into chunks and stored on the storage server (e.g., a cloud storage). The metadata is the additional information maintained to allow restore of backed up data back into its original form.

Typical data backup systems employ snapshots where each snapshot refers to a consistent view of the file system at a specific point of time. However, storing multiple snapshots in the system increases the amount of data stored in the file system. The amount of data stored in the file system is proportional to the number of snapshots stored.

Thus, it may be desirable to reduce the storage footprint by deleting old snapshots and associated data and metadata.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a file system is presented. The file system includes a data storage including a plurality of data blocks. The file system further includes a merge index including a plurality of namespace entries, wherein the plurality of namespace entries includes a plurality of blockmap entries and a plurality of local reference entries. The file system furthermore includes deduplication database including a plurality of deduplication indices and a plurality of global reference entries for a plurality of datasets. The file system moreover includes an indexing system configured to generate the plurality of namespace entries and the plurality of global reference entries.

According to another example embodiment, a file system is presented. The file system includes a memory storing one or more processor-executable routines, and a processor communicatively coupled to the memory. The processor is configured to execute the one or more processor-executable routines to generate and store a plurality of namespace entries for a plurality of datasets in a merge index, wherein the plurality of namespace entries comprises a plurality of blockmap entries and a plurality of local reference entries, and generate and store a plurality of deduplication indices and a plurality of global reference entries for the plurality of datasets in a deduplication database.

According to another example embodiment, a method is presented. The method includes generating and storing a plurality of namespace entries for a plurality of datasets in a merge index, wherein the plurality of namespace entries comprises a plurality of blockmap entries and a plurality of local reference entries, and generating and storing a plurality of deduplication indices and a plurality of global reference entries for the plurality of datasets in a deduplication database.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
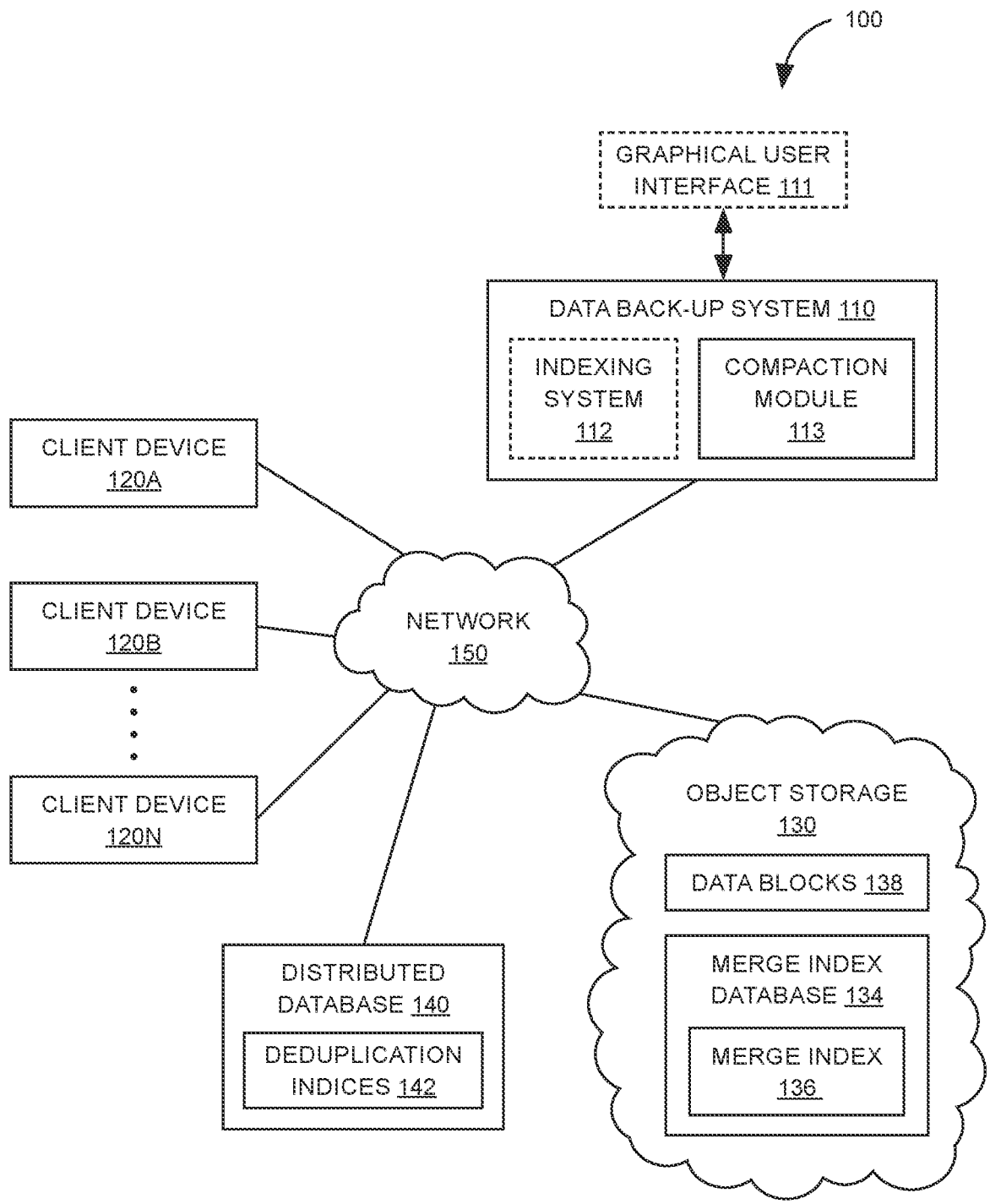
FIG. 1 is a block diagram illustrating an example back-up system environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for compacting backup data in cloud-based storage solutions, and more particularly to systems and methods for compacting backup data in object-based storage solutions. The systems and methods for indexing metadata, according to embodiments of the present description, enable cost-effective and efficient cloud-based storage architecture solutions.

FIG. 1 illustrates an example backup system environment 100 (herein referred to as system environment 100), in accordance with embodiments of the present description. The system environment 100 includes a data backup system 110, one or more client devices 120A, 120B, . . . 120N (collectively referred to as "client device" 120"), a data storage 130, and an optional distributed database 140.

The data backup system 110 may be a software or a hardware component that enables the one or more client devices 120A, 120B, . . . 120N to back up, optionally index and perform compaction of one or more backup datasets. The data backup system 110 includes an indexing system 112 and a compaction module 113, as described in detail later. In some embodiments, the data backup system 110 is a cloud-based service. The data backup system 110 may optionally further provide a graphical user interface 111 for individual clients to access data storage 130 for cloud data management. For example, a graphical user interface 111 may be a front-end cloud storage interface. Additionally, or alternatively, the data backup system 110 may provide APIs for the access and management of data from the data storage 130.

A client device 120 may send a request to read, search, add, delete, or modify data stored on a cloud environment via a front-end graphical user interface 111 provided and operated by the data backup system 110 or via other suitable ways such as application program interfaces (APIs). The one or more client device 120A, 120B, . . . 120N (referred to herein as "device") may be any computing devices that have data that may need backup. Examples of such devices include without limitation, workstations, personal computers, desktop computers, virtual machines, databases, docker containers, or other types of generally fixed computing systems such as mainframe computers, servers, and mini-computers. Other examples of such devices include mobile or portable computing devices, such as one or more laptops, tablet computers, personal data assistants, mobile phones (such as smartphones), IoT devices, wearable electronic devices such as smartwatches, and other mobile or portable computing devices such as embedded computers, set-top boxes, vehicle-mounted devices, wearable computers, etc. Servers can include mail servers, file servers, database servers, virtual machine servers, and web servers.

In some embodiments, the system environment 100 includes a plurality of devices 120. The plurality of devices 120 may be from a single client or different clients being serviced by the system environment 100. In some embodiments, the system environment 100 includes a single device 120 having a plurality of data sets or one large data set that needs backup.

The one or more datasets generally include data generated by the operating system and/or applications executing on the client device 120. In general, the data present in the one or more dataset may include files, directories, file system volumes, data blocks, extents, or any other hierarchies or organizations of data objects. As used herein, the term "data object" refers to (i) any file that is currently addressable by a file system or that was previously addressable by the file system (e.g., an archive file), and/or to (ii) a subset of such a file (e.g., a data block, an extent, etc.). The data present in the one or more datasets may further include structured data (e.g., database files), unstructured data (e.g., documents), and/or semi-structured data.

The one or more datasets further include associated metadata. Metadata generally includes information about data objects and/or characteristics associated with the data objects. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications and/or other components of the client device 120 maintain indices of metadata for data objects, e.g., metadata associated with individual email messages.

In some embodiments, the data storage 130 is an object-based storage 130. Data storage 130 (also known as object-based storage) is a computer data storage architecture that manages data as objects, as opposed to other storage architectures like file storage which manages data as a file hierarchy and block storage which manages data as blocks within sectors and tracks. Non limiting examples of data storages 130 include AMAZON S3, RACKSPACE CLOUD FILES, AZURE BLOB STORAGE, or GOOGLE CLOUD STORAGE. Each object typically may include the data of the object itself, a variable amount of metadata of the object, and a unique identifier that identifies the object. Unlike data files or data blocks, once an object is created, normally it could be difficult to change because the unique identifier of the object often is generated based on the underlying data (e.g., generated based on the checksum of the object). However, unlike file or blocks that often need an operating system of a computer to be accessed, objects may often be accessed directly from a data store and/or through API calls. This allows data storage 130 to scale efficiently in light of various challenges in storing big data. The data storage 130 may store a plurality of data blocks corresponding to one or more data sets from or more client devices 120 (as one or more objects) and merge index 136 in the merge index database 134, as described in detail later.

The data backup system 110 is configured to split the one or more datasets into chunks and store the one or more data sets as objects on the data storage 130. The indexing system 112 of the data backup system 110 is further configured to store metadata of the one or more datasets as objects using a merge index 136 in a merge index database 134 on the data storage 130. Metadata is the additional information maintained to allow restore of backed up data back into its original form.

In some embodiments, the merge index database 134 is configured to be operable on an object-based storage. The merge index database 134 may be used to store index information and/or metadata regarding data structure so that data can be retrieved efficiently. The merge index database 134 according to embodiments of the present description is further configured to allow for versioning of records to associate timelines with metadata records. Due to filesystem storing multiple timelines, the records stored in the merge index 136 are valid within a specific lifespan. The merge index 136 may save namespace metadata in different namespace entries that will be discussed in further detail below.

The system environment further includes an optional distributed database 140. A distributed database is a distributed, often decentralized, system that distributes data among different nodes to provide better data access and operation in case of a failure or offline of one or more nodes. A distributed database is often a NoSQL database server having non-volatile memory. Non-limiting examples of distributed databases include AMAZON DYNAMODB and APACHE CASSANDRA. In some embodiments, the distributed database 140 may be used for data deduplication purpose by storing a plurality of deduplication indices 142. According to some embodiments, checksums of backup data (e.g., snapshots) are created as the deduplication indices of the backup data. For additional details about the operation of the distributed database 140 using the deduplication indices 142, U.S. Pat. No. 8,996,467, patented on Mar. 31, 2015, entitled "Distributed Scalable Deduplicated Data Backup System" is incorporated herein by reference in its entirety unless directly contradictory to the embodiments described herein.

The various components in the system environment 100 may communicate through the network 150 and/or locally. For example, in some embodiments, one of the system components may communicate locally with the data backup system 110, while other components communicate with the data backup system 110 through the networks. In other embodiments, every component in the system environment 100 is online and communicates with each other through the network 150. In one embodiment, the network 150 uses standard communications technologies and/or protocols. Thus, the network 150 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the data backup system 110, the one or more client devices 120A, 120B, . . . 120N, the data storage 130, and the distributed database 140 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
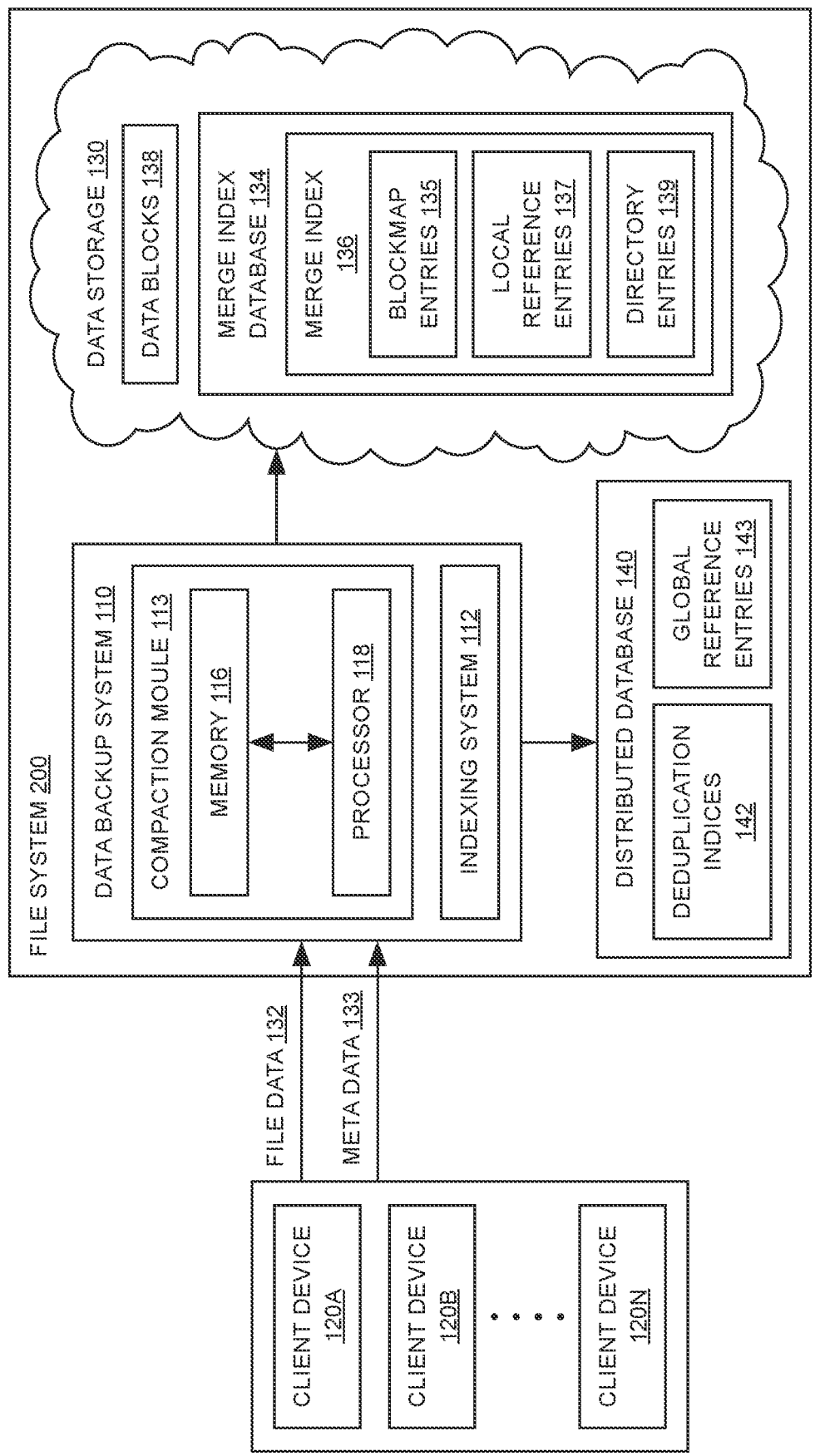
FIG. 2 is a block diagram illustrating an example file system, according to some aspects of the present description.

FIG. 2 is a block diagram of an example file system 200 in accordance with embodiments of the present description. The data backup system 110 and the data storage 130, which communicate to each other through a network, collectively may form the file system 200. The data backup system 110 includes an indexing system 112 and a compaction module 113. The file system 200 in other embodiments may include additional or fewer components. For example, the file system 200 may include additional backup storages which can be conventional data storages. As shown in FIG. 2, the data backup system 110 may serve as the front end of the file system 200 and communicate with the one or more client devices 120.

The data storage 130 is configured to store file data as a plurality of data blocks for one or more files and a plurality of namespace entries corresponding to file data and/or metadata of the one or more files. In some embodiments, the data storage 130 is configured to store the file data and the plurality of namespace entries as objects. The file data may also be captured as one or more snapshots. Snapshots include list of different backup versions/timelines for each backup dataset. Each snapshot is assigned a unique version number. Higher version numbers indicate the most recent backup. In some embodiments, the one or more snapshots may be stored in the distributed database 140.

As shown in FIG. 2, the data backup system 110 is configured to store the file data 132 as a plurality of data blocks 138 in the data storage 130 and metadata 133 as a merge index 136 in the merge index database 134. Further, the compaction module 113 is configured to perform compaction of one or more data blocks of the plurality of data blocks 138 in the data storage 130.

The merge index database 134 is configured to maintain one merge index 136 per backup dataset. A merge index 136 is configured to store a plurality of namespace entries. Non-limiting examples of namespace entries maintained in a merge index 136 include directory entry, block map, local reference entry and the like. Directory entry includes one or more entry for each file and/or folder. Directory entry stores the folder-file hierarchy and details of each version of the file/folder. Block map maintains the list of chunks/offset of each file in the backup dataset. Each block map entry may further store a block identifier for the corresponding data block in the data storage. Local reference entry maintains a record of a block identifier corresponding to a chunk/offset of each file for a particular dataset. The plurality of local reference entries track deduplication information within a particular dataset, as described in detail later.

As shown in FIG. 2, the file system 200 may further include an indexing system 112. The indexing system is configured to generate the plurality of namespace entries. A namespace entry of the plurality of namespace entries may include a key value pair. A key in a namespace entry may be formed by multiple parts. For example, a key may be divided into three parts, which may be a group part, a term part, and a version-identifier part. A group part may be used for entries in the merge index 136 to be ordered by group as the major key. A term part may be used to sort namespace entries for a given group. A version-identifier part may be used to sort entries for a given group-term. In some embodiments, the version identifier includes an operation type conducted on the file data and/or metadata captured in a particular snapshot and a version number corresponding to the particular snapshot. Non-limiting examples of operation type include "create" when a new record is created or when a record is modified, and "delete" when a record is deleted.

There can be different types of namespace entries stored in the merge index 136. For example, in one embodiment, a folder identifier may be stored as the group part of the key and a child/file name as the term part. This type of entry can be used to list files in a folder. In another embodiment, a block map type index may use a file identifier as the group part of the key and an offset as the term part. This type of entry may be used to list all data blocks in a file. The values in the key-value pair namespace entry may be the namespace metadata of the file, such as the file size, modification time, access control, etc. For smaller files, the metadata may also contain the data block identifier. If a data block includes data from multiple files, the metadata may also include offset within the block. Referring again to FIG. 2, in some embodiments, the plurality of namespace entries includes a plurality of blockmap entries 135, a plurality of local reference entries 137, and a plurality of directory entries 139.

An example of a namespace entry for a directory is given below:
Parent=/folder, File name=xyz.pdf, ver=1, seq=8, optype=Create Value={Size: 2 MB, . . . }

In the above example, "parent=/folder" is the group part in the key-value pair, "file name=xyz.pdf" is the term part in the key-value pair, and "ver=1, seq=8, optype=Create" is the version identifier part in the key-value pair. Further, in the above example, the namespace entry records that the file xyz.pdf was created in snapshot version 1, seq 10 with a size of 2 MB.

An example of a namespace entry for a block map index is given below: Path=/folder/xyz.pdf, Offset=1 MB, ver=1, seq=8, optype=Create, Value={Block ID: 1012, Size: 1 MB}

In the above example, "Path=/folder/xyz.pdf" is the group part in the key-value pair, "offset=1 MB" is the term part in the key-value pair, and "ver=1, seq=8, optype=Create" is the version identifier part in the key-value pair. Moreover "Block ID=1012 and Size=1 MB" is the value part of the key value pair.

An example of a namespace entry for a local reference index is given below: Block ID=1012, Path=/folder/xyz.pdf, Offset=0 MB, ver=1, seq=8, optype=Create In the above example, "Block ID=1012" is the group part in the key-value pair, "Path=/folder/xyz.pdf", offset=1 MB' is the term part in the key-value pair, and "ver=1, seq=8, optype=Create" is the version identifier part in the key-value pair.

In some embodiments, the indexing system 112 is further configured to store the plurality of namespace entries in the merge index database 134 as objects that are arranged in a plurality of hierarchical tables that may be referred to as S3Tables. Each merge index 136 includes a plurality of S3Tables, which may be created by different workers of the file system 200 and/or at different times. The namespace entries of the plurality of namespace entries may be stored in different S3Tables in some embodiments.

The indexing system 112 may operate in batches. When a new data file is received in file system 200, a new namespace entry associated with the new data file may not be immediately saved persistently to the data storage 130. Instead, multiple updates to the merge index database 134 may be treated in batches. The new namespace entries (e.g., new key-value pairs) may be first stored temporarily in memory (e.g., a buffer memory) before flushing to the data storage 130. As a result, the namespace entries belonging to the same batch may be stored in a single object, or two or more related serialized objects if the batch has more entries than an object can include. A batch of updates may be processed and persisted by the indexing system 112 in an S3Table that includes one or more objects. The next batch of entries may go to a new S3Table that includes other objects and so on. Since merge indexes are created in batches, multiple S3Tables may be formed for files that are uploaded at different times. Periodically, the indexing system 112 may performs a merge or compaction operation of S3Tables to consolidate the entries in different S3Tables. Hence, in response to a search request, the number of S3Tables that need to be loaded can be reduced and the search speed is improved. The hierarchical structure and manner of operation of generating, merging and compacting the S3Tables are described in U.S. Pat. No. 1,125,667, patented on Feb. 22, 2022, entitled "Deduplicated merge indexed data storage file system" incorporated herein by reference in its entirety unless directly contradictory to the embodiments described herein.

In some embodiments, each namespace entry of the plurality of namespace entries further includes a unique sequence number. A sequence number is a monotonically increasing counter. Each new S3Table is given a new sequence number. An example of a plurality of namespace entries sorted by sequence numbers is given below:
Parent=/folder, File name=doc1, ver=4, seq=78, optype=Create, size=2 MB
Parent=/folder, File name=doc1, ver=4, seq=54, optype=Delete
Parent=/folder, File name=doc1, ver=4, seq=22, optype=Create, size=1 MB As noted earlier, the data backup system further includes a compaction module 113. The compaction module 113 is configured to periodically run a compaction operation for each dataset of the plurality of datasets. In some embodiments, the compaction module 113 is configured to perform one or more operations such as mark delete, data block purge, and merge index cleanup as a part of the compaction operation.

In the mark delete phase, the compaction module is configured to identify one or more compactable data blocks based on the plurality of blockmap entries 135 and a compaction range. In some embodiments, the compaction module 113 is further configured to determine the compaction range based on one or more retention policies defined by a user. The term "retention policy" as used herein refers to a policy defined by a user for expiry of snapshots. Based on the terms defined in the retention policy, the compaction module may take a decision to preserve or delete snapshots. The term "compaction range" as used herein refers to a range of snapshot versions that need to be deleted during a compaction operation. As noted earlier, to restrict the data storage growth, file system users can define retention policies to limit the number of snapshots stored in the file system. Compaction is the process of garbage collecting data from the expired snapshots.

In some embodiments, the compaction module 113 is configured to identify the one or more compactable blocks by comparing the compaction range with a life span of a blockmap entry of the plurality of blockmap entries 135. As noted earlier, each blockmap entry of the plurality of blockmap entries includes an operation type conducted on the file data captured in a particular snapshot and a version number corresponding to the particular snapshot. The compaction module 113 is further configured to determine a life span of a blockmap entry based on one or more operation types corresponding to the blockmap entry. In some embodiments, the compaction module 113 may be configured to traverse the plurality of block map entries and determine a life span of a blockmap entry based on the operation types and snapshot versions corresponding to the blockmap entry. The compaction module may be further configured to determine an end of file for a blockmap entry based on an operation type "end of file" recorded for a corresponding directory entry.

The compaction module 113 is further configured to identify one or more block identifiers corresponding to the one or more compactable data blocks from the plurality of blockmap entries 135. The compaction module 113 is furthermore configured to add one or more delete records corresponding to the one or more block identifiers in the plurality of local reference entries 137. The one or more delete records include the same key value pair as the corresponding local reference entry 137, except for a change in the operation type in the object identifier to "delete" instead of "create". This is further elucidated by way of an example embodiment in FIGS. 3 and 5 later.

In the data block purge phase, the compaction module 113 is configured to check, for each block identifier, whether a delete record is present corresponding to a local reference entry of the plurality of local reference entries. The compaction module 113 is further configured to perform compaction of a data block if all the local reference entries for a block identifier corresponding to a data block have a corresponding delete record.

In some embodiments, the compaction module 113 is further configured to cleanup one or more blockmap entries from the merge index 136 during the merge index clean up phase. In such embodiments, the compaction module 113 is further configured to add one or more delete records corresponding to the one or more compactable data blocks in the plurality of block map entries; and delete one or more blockmap entries from the plurality of blockmap entries if the one or more blockmap entries have a corresponding delete record. In some embodiments, the compaction module 113 may be configured to add one or more delete records corresponding to the one or more compactable data blocks in the plurality of block map entries during the mark delete phase itself.

In some embodiments, the compaction module 113 is further configured to cleanup one or more local reference entries from the merge index 136 during the merge index clean up phase. In such embodiments, the compaction module 113 is further configured to delete one or more local reference entries from the plurality of local reference entries if the one or more local reference entries have a corresponding delete record.

In some embodiments, the compaction module 113 is further configured to cleanup one or more directory entries from the merge index 136. In such embodiments, the compaction module 113 is further configured to identify one or more directory entries from the plurality of directory entries having a lifespan within the compaction range; and add one or more delete records corresponding to the one or more directory entries in the plurality of directory entries. The compaction module 113 may be configured to identify the one or more directory entries and add one or more corresponding delete records in the mark delete phase, in some embodiments. The compaction module 113 may be further configured to delete one or more directory entries from the plurality of directory entries if the one or more directory entries have a corresponding delete record in the merge index cleanup phase. In some embodiments, the compaction module 113 may be configured to delete one or more blockmap entries from the plurality of blockmap entries based on the deleted one or more directory entries The manner of operation of the compaction module 113 is further illustrated with reference to example scenarios illustrated in FIGS. 3-9. In the example scenarios illustrated in FIGS. 3-6, a file xyz.pdf has three snapshots corresponding to it. In snapshot 1 the file xyz.pdf was created having two blocks of size 1 MB each. Snapshot 1 was later deleted. In snapshot 2, first block of the file was modified. Further in snapshot 3, the file xyz.pdf was marked deleted by inserting EOF record in a corresponding directory entry.

Figure 3:
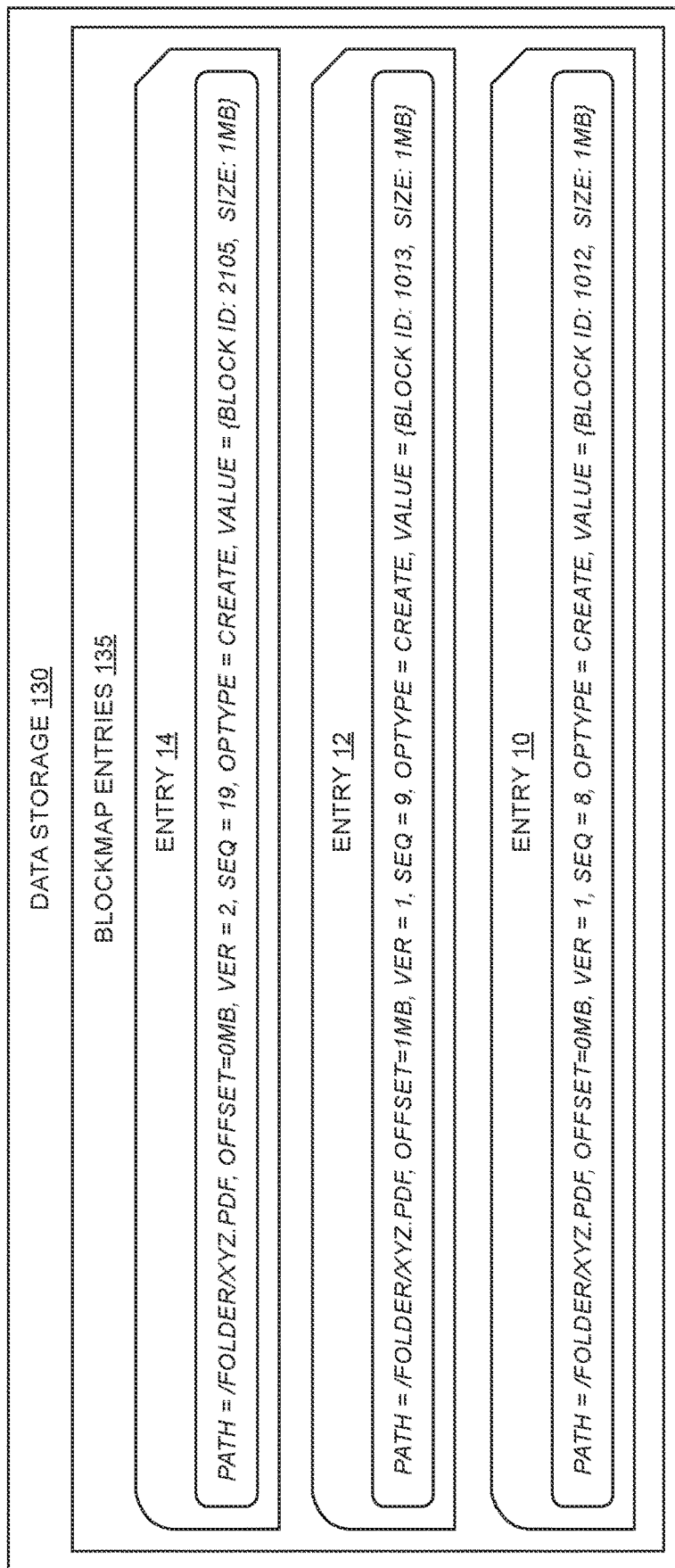
FIG. 3 is a diagram illustrating an example plurality of blockmap entries, according to some aspects of the present description.

FIG. 3 illustrates the plurality of blockmap entries 135 in the merge index 136 corresponding to the example above. In some embodiments, the indexing system 112 may be configured to add the plurality of blockmap entries in the merge index 136. As shown in FIG. 3, the blockmap entry 10 records a namespace entry for a block corresponding to file xyz.pdf with offset=0 MB was created in snapshot version 1, sequence 8. Further the blockmap entry includes a block identifier (Block ID) of 1012 and a size of 1 MB. Similarly, the blockmap entry 12 records a namespace entry for a block corresponding to file xyz.pdf with offset=1 MB was created in snapshot version 1, sequence 9. Further the blockmap entry includes a block identifier (Block ID) of 1013 and a size of 1 MB. As noted earlier, first block of the file (i.e., block with offset 0) was modified in snapshot 2. This is recorded in blockmap entry 14 where a blockmap entry corresponding to file xyz.pdf having an offset 0 is again created in snapshot version 2, sequence 19. It should be noted that although the directory entry corresponding to the file shows end of file, an explicit delete entry is not added in the initial plurality of blockmap entries 135 by the indexing system.

Figure 4:
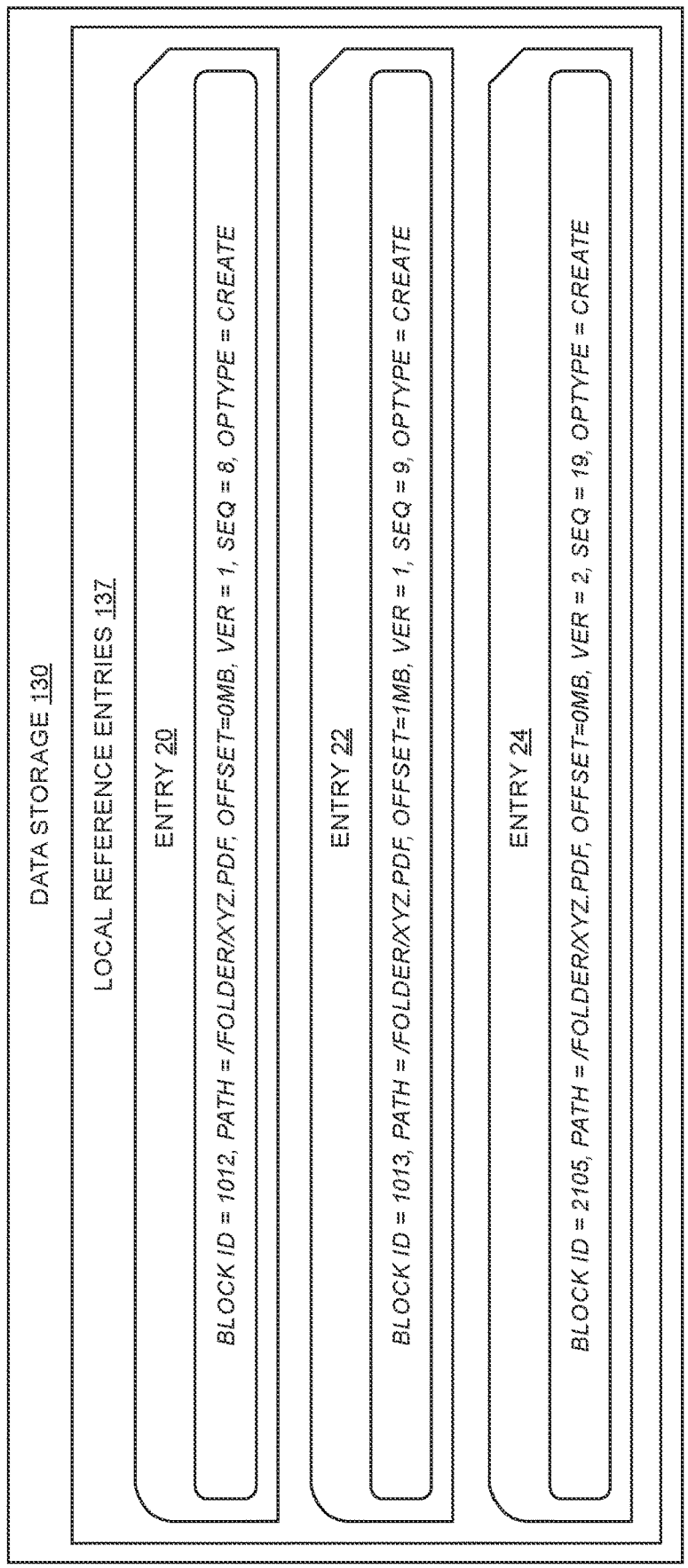
FIG. 4 is a diagram illustrating an example plurality of local reference entries, according to some aspects of the present description.

FIG. 4 illustrates the plurality of local reference entries 137 in the merge index 136 corresponding to the example illustrated above in FIG. 3. In some embodiments, the indexing system 112 may be configured to add the plurality of local reference entries 137 in the merge index 136. As shown in FIG. 4, the local reference entry 20 records a namespace entry corresponding to block identifier 1012. Similarly, the local reference entry 22 records a namespace entry corresponding to block identifier 1013 and the local reference entry 24 records a namespace entry corresponding to block identifier 2105.

Figure 5:
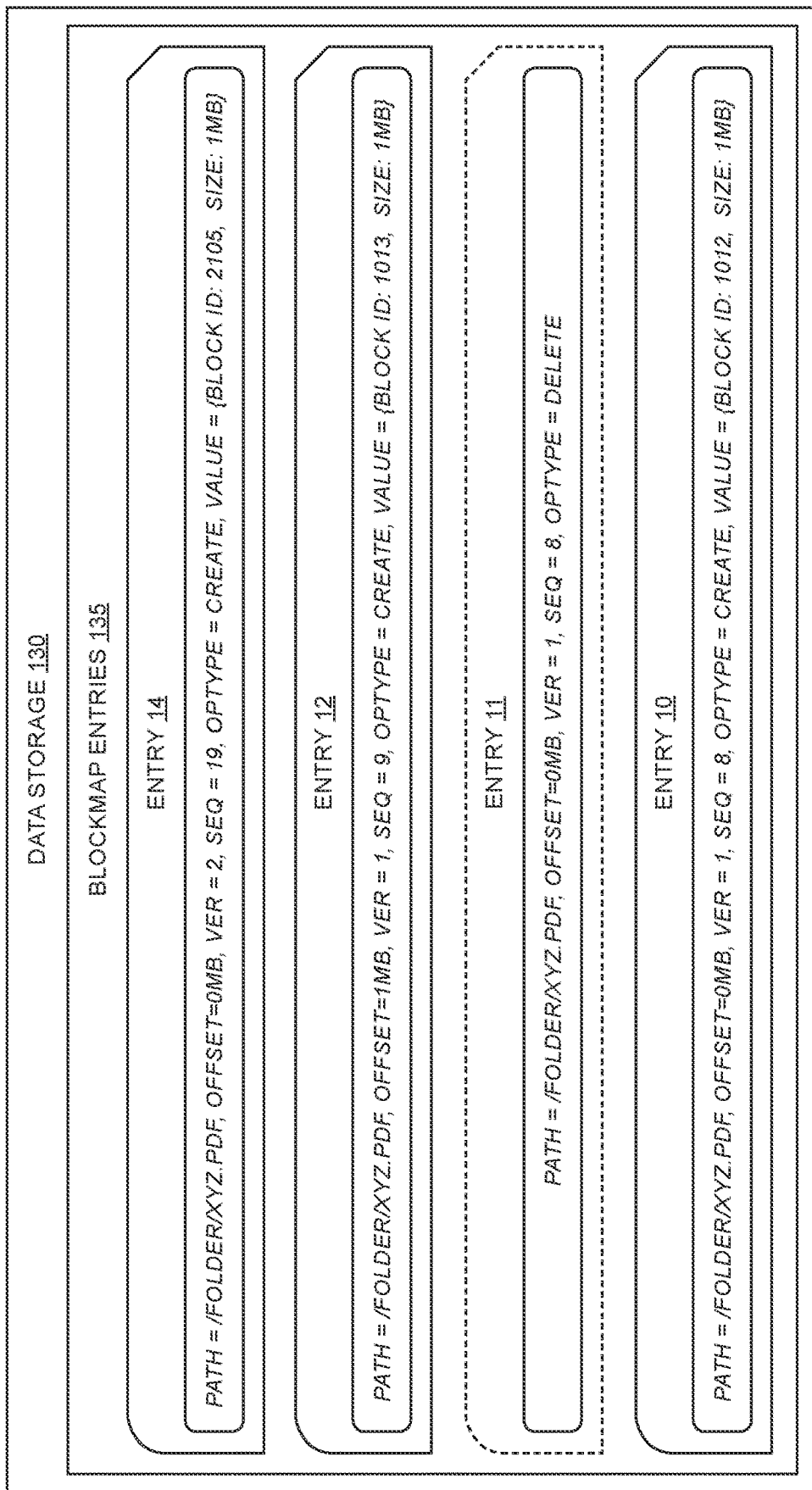
FIG. 5 is a diagram illustrating an example plurality of blockmap entries, according to some aspects of the present description.
Figure 6:
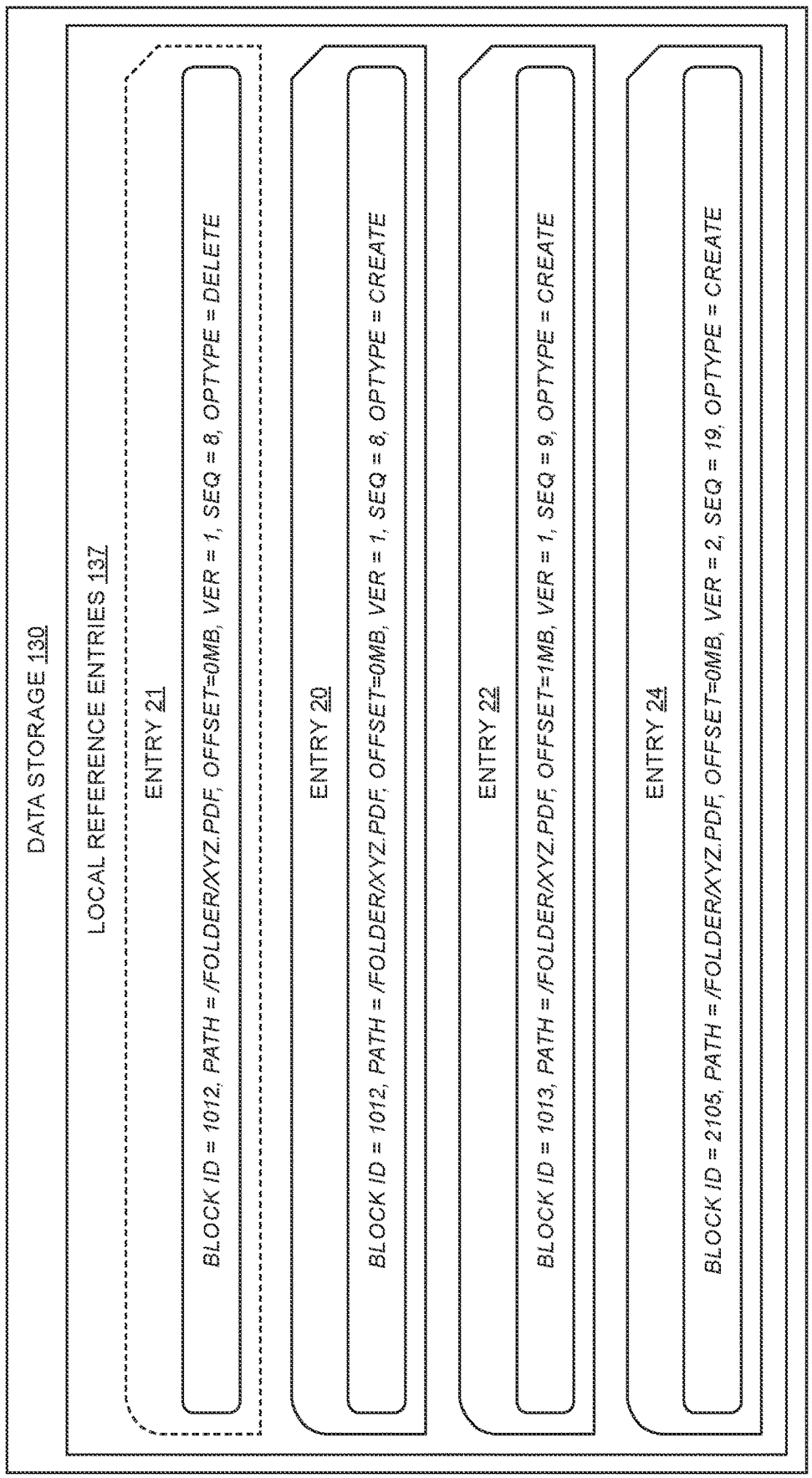
FIG. 6 is a diagram illustrating an example plurality of local reference entries, according to some aspects of the present description.

As noted earlier, the compaction module 113 is configured to traverse the block map entries to identify compactable blocks based on a compaction range during the mark delete phase. In the example illustrated in FIGS. 3 and 4, the compaction range may be defined as a range between snapshot versions 1 to 2. Therefore, the compaction module 113 is configured to determine the block with offset 0 (corresponding to block map entry 10) as a compactable data block. The compaction module 113 is further configured to identify blockmap entry 10 as a merge index entry for deletion. In some embodiments, the compaction module is further configured to add a delete record 11 corresponding to the block map entry as shown in FIG. 5. The delete record 11 is similar to the block map entry 10 except that the operation type is now marked "delete".

The compaction module 113 is further configured to identify a block identifier corresponding to the blockmap entry 10, which is 1012 during the mark delete phase. As noted earlier, the compaction module 113 is further configured to add a delete record 21 for the local reference entry 20 corresponding to the block identifier 1012 during the mark delete phase. This is further illustrated in FIG. 6.

During the data block purge phase, the compaction module 113 is configured to traverse the plurality of local reference entries 137 and check, for each block identifier, whether a delete record is present corresponding to a local reference entry of the plurality of local reference entries 137. In the example illustrated in FIG. 6, only block identifier 1012 has a delete record 21 present corresponding to a local reference entry 20. The block identifiers 1013 and 2105 do not have any corresponding delete record present. Therefore, according to embodiments of the present description, the compaction module 113 is further configured to perform compaction of the data block with offset 0 corresponding to block identifier 1012. Data blocks corresponding to block identifiers 1013 and 2105 are however not compacted.

As noted earlier, the compaction module 113 is further configured to clean up the merge index 134 based on the inserted delete records. In the example illustrated in FIG. 5, the compaction module 113 is configured to delete the blockmap entries 10 and 11. Further, in the example illustrated in FIG. 6, the compaction module 113 is configured to delete the local reference entries 20 and 21.

Figure 7:
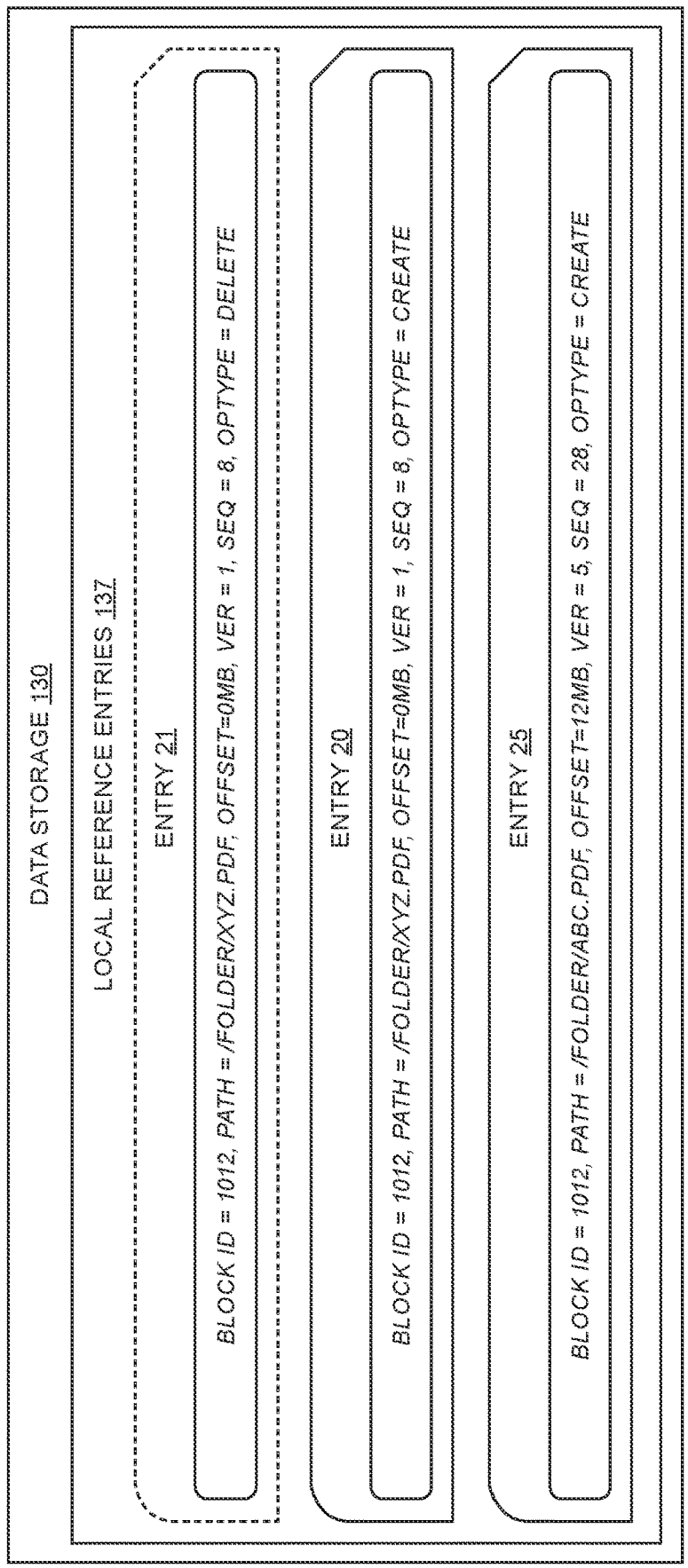
FIG. 7 is a diagram illustrating an example plurality of local reference entries, according to some aspects of the present description.

FIG. 7 illustrates another example scenario in accordance with embodiments of the present description. In the example illustrated in FIG. 7, the block identifier 1012 has another local reference entry 25 corresponding to a block with an offset of 12 MB for file abc.pdf. In the illustrated example, as all the local references corresponding to the block identifier 1012 do not have a corresponding delete record, the data block is not compacted. However, the local reference entries 20 and 21 are deleted from the merge index 136.

Figure 8:
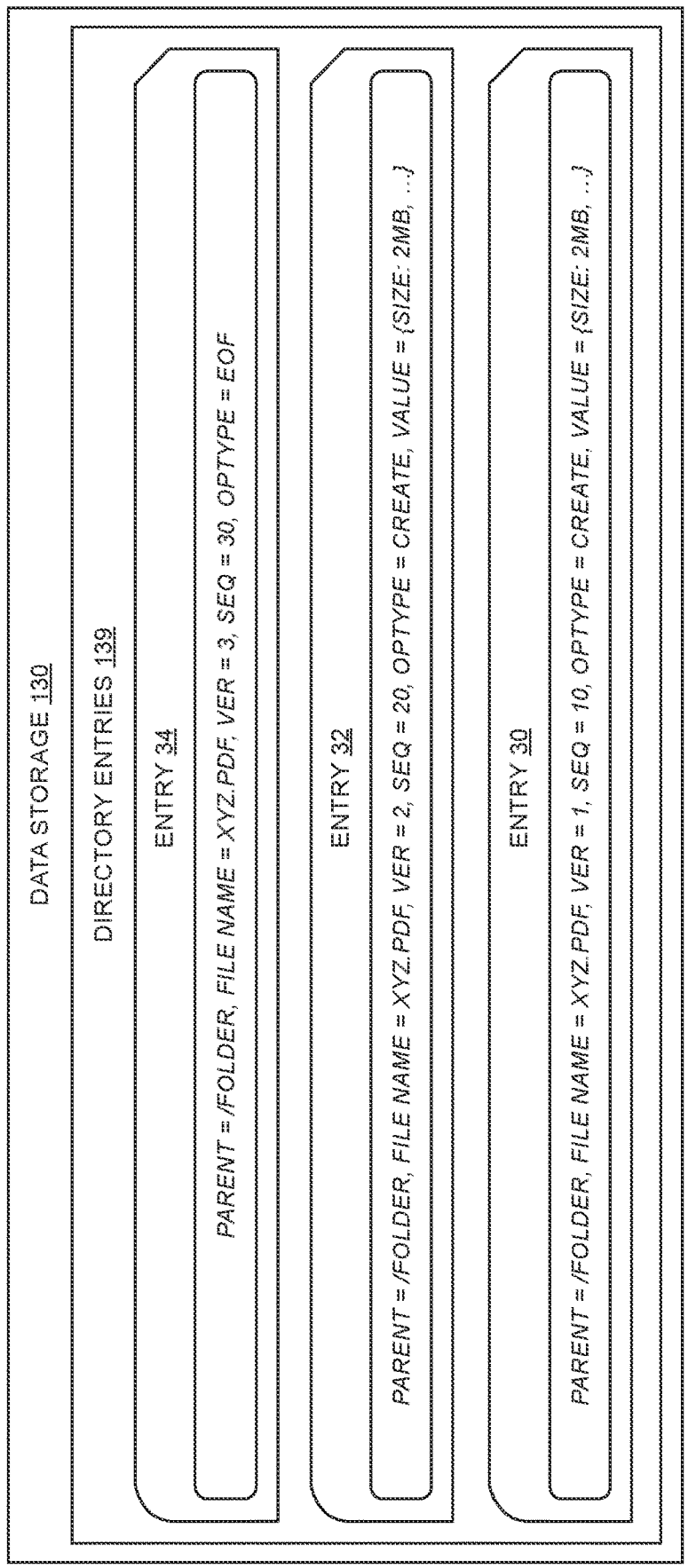
FIG. 8 is a diagram illustrating an example plurality of directory entries, according to some aspects of the present description.
Figure 9:
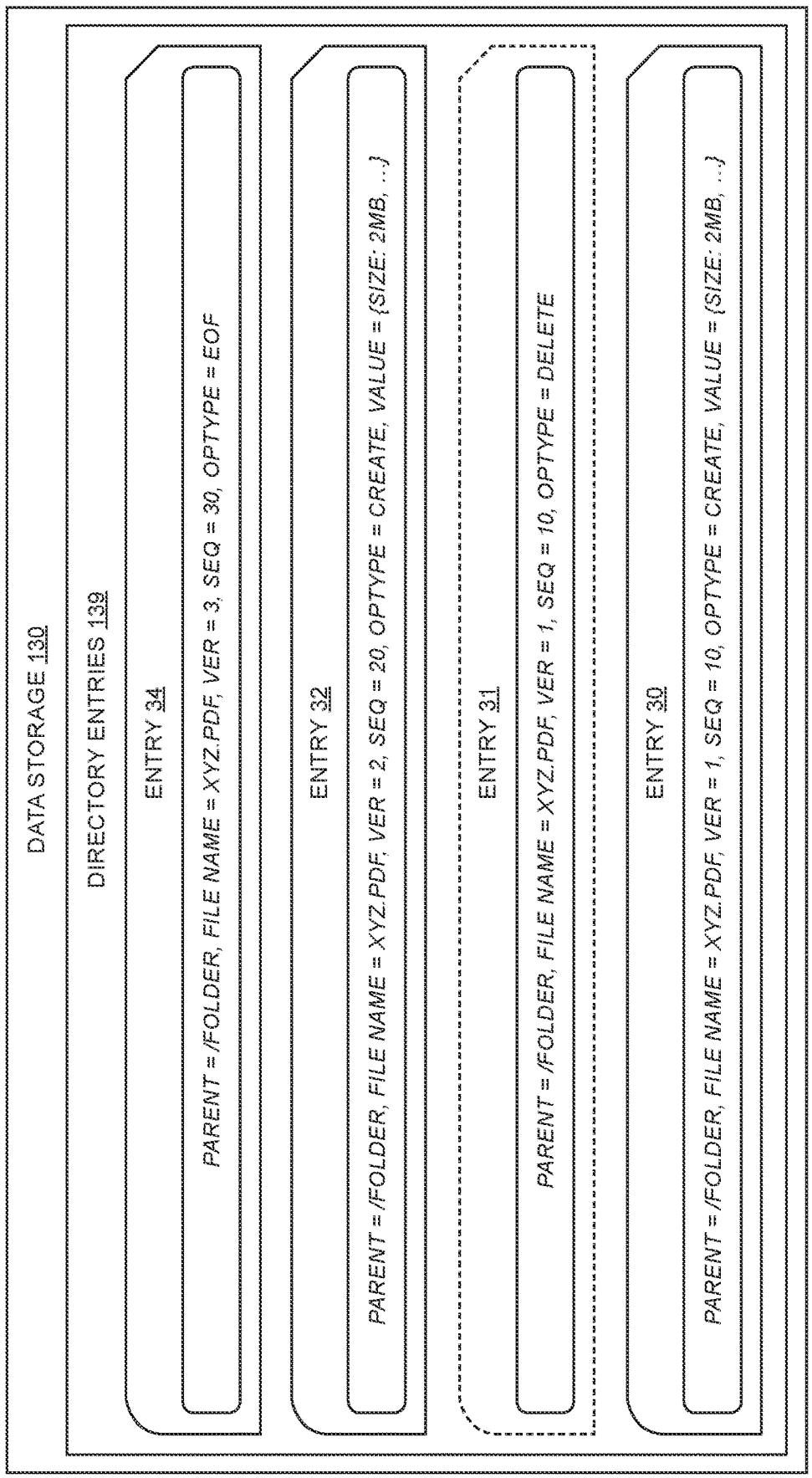
FIG. 9 is a diagram illustrating an example plurality of directory entries, according to some aspects of the present description.

Referring now to FIG. 8, a plurality of directory entries corresponding to example scenario in FIG. 3 is illustrated. The compaction module 113 is configured to traverse the plurality of directory entries and identify one or more directory entries having a lifespan within the compaction range. In the example illustrated, directory entry 30 has a lifespan within the compaction range. The compaction module 113 is further configured to add a delete record 31 corresponding to the directory entry 30, as shown in FIG. 9. The compaction module 113 is further configured to delete the directory entries 30 and 31 and corresponding block map entries 20 and 21 during the merge index cleanup phase Referring again to FIG. 2, the compaction system 113 further includes a memory 116 storing one or more processor-executable routines, and a processor 118. The processor 118 is further configured to execute the processor-executable routines to perform the steps illustrated in the flow-chart of FIG. 10.

Figure 10:
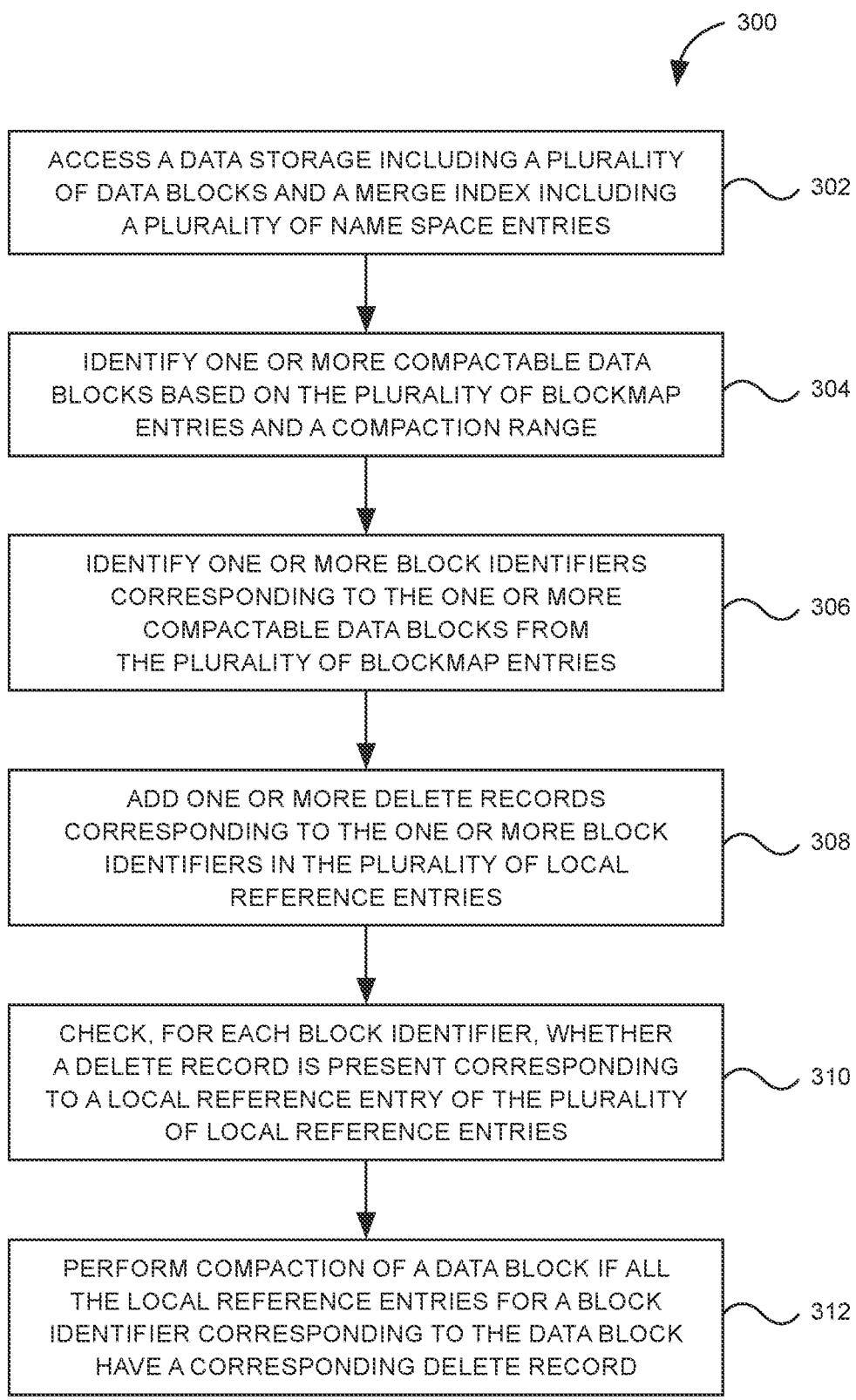
FIG. 10 is a flow chart illustrating an example compaction method, according to some aspects of the present description.

FIG. 10 is a flowchart illustrating a method 300 for compacting data. The method 300 may be implemented using the file system 200 of FIG. 2, according to some aspects of the present description. Each step of the method 300 is described in detail below.

The method 300 includes, at block 302, accessing a data storage including a plurality of data blocks, and a merge index including a plurality of namespace entries, The plurality of namespace entries including a plurality of blockmap entries and a plurality of local reference entries.

The method 300 further includes, at block 304, identifying one or more compactable data blocks based on the plurality of blockmap entries and a compaction range. In some embodiments, the method 300 further includes determining the compaction range based on one or more retention policies defined by a user.

The method 300 further includes, at block 306, identifying one or more block identifiers corresponding to the one or more compactable data blocks from the plurality of blockmap entries. In some embodiments, the method 300 includes identifying one or more compactable blocks by comparing the compaction range with a life span of a blockmap entry of the plurality of blockmap entries. In some embodiments, the method includes determining a life span of a blockmap entry based on one or more operation types corresponding to the blockmap entry.

At block 308, the method further includes adding one or more delete records corresponding to the one or more block identifiers in the plurality of local reference entries. The method 300 further includes, at block 310, checking, for each block identifier, whether a delete record is present corresponding to a local reference entry of the plurality of local reference entries. Moreover, the method 300 includes, at block 312, performing compaction of a data block if all the local reference entries for a block identifier corresponding to the data block have a corresponding delete record.

In some embodiments, the method 300 further includes adding one or more delete records corresponding to the one or more compactable data blocks in the plurality of block map entries and deleting one or more blockmap entries from the plurality of blockmap entries if the one or more blockmap entries have a corresponding delete record. In some embodiments, the method 300 further includes deleting one or more local reference entries from the plurality of local reference entries if the one or more local reference entries have a corresponding delete record.

In some embodiments, the plurality of namespace entries further includes a plurality of directory entries, and the method further includes identifying one or more directory entries from the plurality of directory entries having a lifespan within the compaction range; adding one or more delete records corresponding to the one or more directory entries in the plurality of directory entries; deleting one or more directory entries from the plurality of directory entries if the one or more directory entries have a corresponding delete record; and deleting one or more blockmap entries from the plurality of blockmap entries based on the one or more deleted directory entries.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 11:
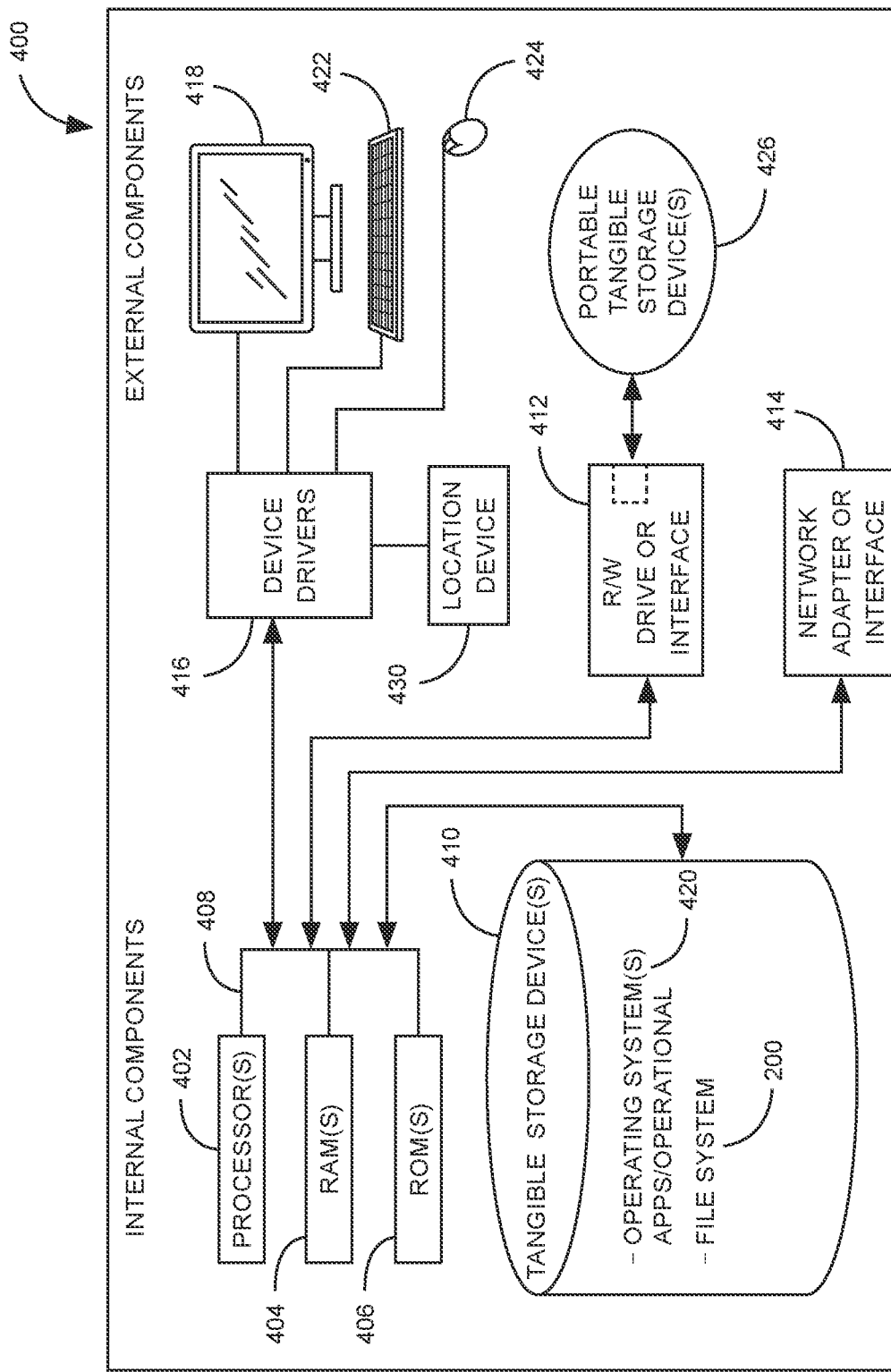
FIG. 11 is a block diagram illustrating an example computer system, according to some aspects of the present description.

One example of a computing system 400 is described below in FIG. 11. The computing system 400 includes one or more processor 402, one or more computer-readable RAMs 404 and one or more computer-readable ROMs 406 on one or more buses 408. Further, the computer system 400 includes a tangible storage device 410 that may be used to execute operating systems 420 and file system 200. Both, the operating system 420 and the file system 200 are executed by processor 402 via one or more respective RAMs 404 (which typically includes cache memory). The execution of the operating system 420 and/or file system 200 by the processor 402, configures the processor 402 as a special-purpose processor configured to carry out the functionalities of the operation system 420 and/or the file system 200, as described above.

Examples of storage devices 410 include semiconductor storage devices such as ROM 406, EPROM, flash memory or any other computer-readable tangible storage device that may store a computer program and digital information.

Computing system 400 also includes a R/W drive or interface 412 to read from and write to one or more portable computer-readable tangible storage devices 426 such as a CD-ROM, DVD, memory stick or semiconductor storage device. Further, network adapters or interfaces 414 such as a TCP/IP adapter cards, wireless Wi-Fi interface cards, or 3G or 4G wireless interface cards or other wired or wireless communication links are also included in the computing system 400.

In one example embodiment, the file system 200 may be stored in tangible storage device 410 and may be downloaded from an external computer via a network (for example, the Internet, a local area network or another wide area network) and network adapter or interface 414.

Computing system 400 further includes device drivers 416 to interface with input and output devices. The input and output devices may include a computer display monitor 418, a keyboard 422, a keypad, a touch screen, a computer mouse 424, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

What is claimed is:

1. A file system, comprising:
a data storage comprising a plurality of data blocks;
a merge index comprising a plurality of namespace entries, wherein the plurality of namespace entries comprises a plurality of blockmap entries and a plurality of local reference entries;
a deduplication database comprising a plurality of deduplication indices and a plurality of global reference entries for a plurality of datasets;
an indexing system configured to generate the plurality of namespace entries and the plurality of global reference entries; and
a compaction module configured to:
identify one or more compactable data blocks from the plurality of data blocks based on the plurality of blockmap entries and a compaction range;
identify one or more block identifiers corresponding to the one or more compactable data blocks from the plurality of blockmap entries; and
add one or more delete records corresponding to the one or more block identifiers in the plurality of local reference entries.

2. The file system of claim 1, wherein the compaction module is further configured to:
check, for each block identifier, whether a delete record is present corresponding to a local reference entry of the plurality of local reference entries for a particular dataset;
check, for a block identifier, if a corresponding global reference entry for another dataset is present, if all the local reference entries for the block identifier have a corresponding delete record; and
perform compaction of a data block corresponding to the block identifier if a corresponding global reference entry for another dataset is not present.

3. The file system of claim 2, wherein each global reference entry of the plurality of global reference entries comprises a corresponding recent reference version, and the compaction module is further configured to:
define a compaction start version corresponding to a latest snapshot version at the start of a compaction process;
compare the recent reference version in the global reference entry for the block identifier with the compaction start version; and
perform compaction of the data block if the recent reference version is less than or equal to the compaction start version.

4. The file system of claim 2, wherein the compaction module is further configured to:
add one or more delete records corresponding to the one or more compactable data blocks in the plurality of block map entries; and
delete one or more blockmap entries from the plurality of blockmap entries if the one or more blockmap entries have a corresponding delete record.

5. The file system of claim 2 wherein the compaction module is further configured to delete one or more local reference entries from the plurality of local reference entries if the one or more local reference entries have a corresponding delete record.

6. The file system of claim 2, wherein the compaction module is further configured to delete a global reference entry in the plurality of global reference entries corresponding to a particular dataset if all the local reference entries for a corresponding block identifier have a corresponding delete record.

7. The file system of claim 1, wherein the compaction module is further configured to delete a checksum in the plurality of deduplication indices corresponding to the block identifier.

8. The file system of claim 1, wherein the compaction module is further configured to determine the compaction range based on one or more retention policies defined by a user.

9. A file system, comprising:
 a memory storing one or more processor-executable routines; and
 a processor communicatively coupled to the memory, the processor configured to execute the one or more processor-executable routines to:
  generate and store a plurality of namespace entries for a plurality of datasets in a merge index, wherein the plurality of namespace entries comprises a plurality of blockmap entries and a plurality of local reference entries;
  generate and store a plurality of deduplication indices and a plurality of global reference entries for the plurality of datasets in a deduplication database;
  identify one or more compactable data blocks from a plurality of data blocks based on a plurality of blockmap entries and a compaction range;
  identify one or more block identifiers corresponding to the one or more compactable data blocks from the plurality of blockmap entries; and
  add one or more delete records corresponding to the one or more block identifiers in the plurality of local reference entries.

10. The file system of claim 9, wherein the processor is further configured to execute the one or more processor-executable routines to:
 check, for each block identifier, whether a delete record is present corresponding to a local reference entry of the plurality of local reference entries for a particular dataset;
 check, for a block identifier, if a corresponding global reference entry for another dataset is present, if all the local reference entries for the block identifier have a corresponding delete record; and
 perform compaction of a data block corresponding to the block identifier if a corresponding global reference entry for another dataset is not present.

11. The file system of claim 10, wherein each global reference entry of the plurality of global reference entries comprises a corresponding recent reference version, and the processor is further configured to:
 define a compaction start version corresponding to a latest snapshot version at the start of a compaction process;
 compare the recent reference version in the global reference entry for the block identifier with the compaction start version; and
 perform compaction of the data block if the recent reference version is less than or equal to the compaction start version.

12. The file system of claim 11, wherein the processor is further configured to:
 add one or more delete records corresponding to the one or more compactable data blocks in the plurality of block map entries; and
 delete one or more blockmap entries from the plurality of blockmap entries if the one or more blockmap entries have a corresponding delete record.

13. A method, comprising:
 generating and storing a plurality of namespace entries for a plurality of datasets in a merge index, wherein the plurality of namespace entries comprises a plurality of blockmap entries and a plurality of local reference entries;
 generating and storing a plurality of deduplication indices and a plurality of global reference entries for the plurality of datasets in a deduplication database;
 identifying one or more compactable data blocks from a plurality of deduplicated data blocks based on a plurality of blockmap entries and a compaction range;
 identifying one or more block identifiers corresponding to the one or more compactable data blocks from the plurality of blockmap entries; and
 adding one or more delete records corresponding to the one or more block identifiers in a plurality of local reference entries.

14. The method of claim 13, further comprising:
 checking, for each block identifier, whether a delete record is present corresponding to a local reference entry of the plurality of local reference entries for a particular dataset;
 checking, for a block identifier, if a corresponding global reference entry for another dataset is present, if all the local reference entries for the block identifier have a corresponding delete record; and
 performing compaction of a deduplicated data block corresponding to the block identifier if a corresponding global reference entry for another dataset is not present.

15. The method of claim 14, wherein each global reference entry of the plurality of global reference entries comprises a corresponding recent reference version, and the method further comprises
 comparing the recent reference version in the global reference entry for the block identifier with a latest snapshot version corresponding to the block identifier; and
 performing compaction of the deduplicated data block if the recent reference version is less than or equal to the latest snapshot version.

16. The method of claim 14, further comprising:
 adding one or more delete records corresponding to the one or more compactable data blocks in the plurality of block map entries; and
 deleting one or more blockmap entries from the plurality of blockmap entries if the one or more blockmap entries have a corresponding delete record.

17. The method of claim 16, further comprising deleting one or more local reference entries from the plurality of local reference entries if the one or more local reference entries have a corresponding delete record.

18. The method of claim 17, further comprising deleting a global reference entry in the plurality of global reference entries corresponding to a particular dataset if all the local reference entries for a corresponding block identifier have a corresponding delete record.

19. The method of claim 14, further comprising deleting a checksum in the plurality of deduplication indices corresponding to the block identifier.

20. The method of claim 13, further comprising determining the compaction range based on one or more retention policies defined by a user.

* * * * *